US007034910B2

(12) United States Patent
Wiemer

(10) Patent No.: US 7,034,910 B2
(45) Date of Patent: Apr. 25, 2006

(54) LIQUID CRYSTAL DISPLAY DEVICE

(75) Inventor: Wolfram Wiemer, Blaustein (DE)

(73) Assignee: Element Displays Dr. Wiemer GmbH, Blaustein (DE)

( * ) Notice: Subject to any disclaimer, the term of this patent is extended or adjusted under 35 U.S.C. 154(b) by 0 days.

(21) Appl. No.: 10/474,564

(22) PCT Filed: Apr. 6, 2002

(86) PCT No.: PCT/EP02/03836

§ 371 (c)(1), (2), (4) Date: Apr. 5, 2004

(87) PCT Pub. No.: WO02/084383

PCT Pub. Date: Oct. 24, 2002

(65) Prior Publication Data

US 2004/0150770 A1 Aug. 5, 2004

(30) Foreign Application Priority Data

Apr. 12, 2001 (DE) .......................... 201 06 574 U
Dec. 12, 2001 (EP) .................................. 01129614

(51) Int. Cl.
*G02F 1/1333* (2006.01)

(52) U.S. Cl. ....................................... 349/110; 349/111

(58) Field of Classification Search ................ 349/110, 349/111
See application file for complete search history.

(56) References Cited

U.S. PATENT DOCUMENTS

| | | | | |
|---|---|---|---|---|
| 4,896,947 | A | 1/1990 | Leenhouts | |
| 4,952,030 | A | 8/1990 | Nakagawa et al. | |
| 5,847,792 | A | 12/1998 | Kobayashi et al. | |
| 6,407,783 | B1 * | 6/2002 | Ohgawara et al. | 349/110 |

FOREIGN PATENT DOCUMENTS

| | | | |
|---|---|---|---|
| EP | 0 264 662 | B1 | 12/1992 |
| EP | 0 264 667 | B1 | 12/1992 |
| JP | 08220524 | | 8/1996 |
| JP | 10123498 | | 5/1998 |

* cited by examiner

*Primary Examiner*—James A. Dudek
(74) *Attorney, Agent, or Firm*—Pauley Petersen & Erickson

(57) ABSTRACT

A liquid crystal display device with a negative display when no current is supplied. The device includes a liquid crystal layer that is built into an active zone between substrates, the exterior of each of the substrates is covered by pole filters that are aligned in an arrangement for the currentless negative display. The interior of the substrates has segments of surface electrodes that are separated from one another by electrically insulating dividing lines, the segments being connected to connection lines that lead to the exterior. Masking is provided on the interior of the substrate for areas that would otherwise remain bright during retrace blanking. This invention provides an advantageous construction and display quality, because the periphery of the active zone is encompassed by adhesive strips, which appear black, between the substrates, and because the masking, at least in bright areas that would otherwise be visible from a conventional viewing distance during retrace blanking, is produced by additional adhesive strips.

11 Claims, 1 Drawing Sheet

LIQUID CRYSTAL DISPLAY DEVICE

BACKGROUND OF THE INVENTION

1. Field of the Invention

This invention relates to a liquid crystal display device, which in a voltageless state is bright, having a liquid crystal layer placed in an active zone between substrates, the substrates each being covered on an outside by pole filters oriented in an arrangement for the voltageless bright display and on an inside carrying segments of surface electrodes. The segments are separated from one another by electrically insulating dividing lines, and the segments are connected to connection lines leading to the outside, and masking is provided for areas that otherwise remain bright in retrace blanking, on the inside of the substrate.

2. Discussion of Related Art

One liquid crystal display device is disclosed in U.S. Pat. No. 4,952,030. Such liquid crystal display devices for generating displays that are bright in the voltageless state have the advantage, over displays that are dark in the voltageless state, that the dark activated areas of the cells do not appear in color but instead are correctly black. The bright areas that are not activated are equally bright for light from all directions and thus the incident light is better utilized than in cells that are dark, when voltageless. The displays that are bright when voltageless can also be produced markedly less expensively, among other reasons because the dark background does not appear in color as a function of the viewing angle, and complicated countermeasures need not be taken to achieve a uniform color. In the cell that is bright when voltageless, the optical axes of the two polarization sheets are crossed. The non-activated areas are always bright, while the activated segments are conversely black. Thus even the region of the edge of the adhesive that encloses the liquid crystal area appears black. U.S. Pat. No. 4,952,030 teaches possible ways, in the case of displays that are bright when voltageless, of displaying bright segments on a dark background with good contrast and in particular even with an oblique viewing angle, for instance from a lower half-space. Thus, a twisting angle of the liquid crystal layer of <90° and in particular of 50° to 80° is recited. However, in such displays that are bright when voltageless, it is difficult to cause the bright non-activated areas to appear dark. For that purpose, the bright areas are covered with a light-absorbing mask, which to avoid parallax is usually placed on the inside of the substrate, as recited in U.S. Pat. No. 4,952,030. Masking is an expensive, complicated additional step in production.

A further liquid crystal display device for generating displays that are bright in the voltageless state is shown in German Patent Disclosure DE 37 82 916 A1 wherein a twisting angle of the liquid crystal layer of <90° is recited, for achieving favorable viewing from an oblique direction to the normal.

SUMMARY OF THE INVENTION

One object of this invention is to provide a liquid crystal display device which with a simplified design produces the best possible display properties, and in particular even for relatively large displays.

This object is accomplished with characteristics of the invention taught in this specification and in the claims. The active zone is surrounded on the periphery with adhesive strips that appear black between the substrates. The masking is produced, at least in bright areas so at the conventional viewing distance they are clearly visible which is produced by further adhesive strips.

Thus, the masking is accomplished with the same material and in the same production step as making the outlining of the active zone and the adhesive bonding of the two substrates. As a result, there is a marked reduction in production costs and a stable design of the display device. In this embodiment, in displays that are bright when voltageless all the areas in which there is no liquid crystal appear black and is exploded, which is also true for those areas in which the adhesive is located. By application using adhesive pressure, the adhesive can be applied exactly and in an easily predetermined manner in areas to be masked within the cell during production. The result is a malfunction-free display, which in conjunction with a liquid crystal with a twisting angle of <90° is preferably advantageous even for oblique viewing, for instance from a lower half-space.

One advantageous feature for the structure and realization of the display is that the further adhesive strips are disposed at least in the region of the connection lines.

Further advantageous provisions for the structure and realization of the display are obtained by providing the active zone as rectangular or square in shape. Further adhesive strips are disposed continuously parallel to an outside, at equal spacings, for forming subsidiary regions in the form of rows or columns. A favorable design is that a plurality of connection lines are placed jointly near or in the region of the further adhesive strips.

An advantageous arrangement is achieved by subdividing the rows or columns into a plurality of equal-size square or rectangular subgroups of segments, each including at least one segment.

For a simple line course and thus the simple structure, each segment adjoins one adhesive strip or further adhesive strips, which cover connection lines.

A simple production is achieved with a peripheral side that is interrupted, for introducing the liquid crystal, in the region of an adhesive strip meeting it at a right angle, and with each thus-formed introduction opening leading to two subsidiary regions located side by side.

BRIEF DESCRIPTION OF THE DRAWINGS

This invention is described in further below in view of embodiments shown in the drawings, wherein.

DESCRIPTION OF PREFERRED EMBODIMENTS

Figure 1:
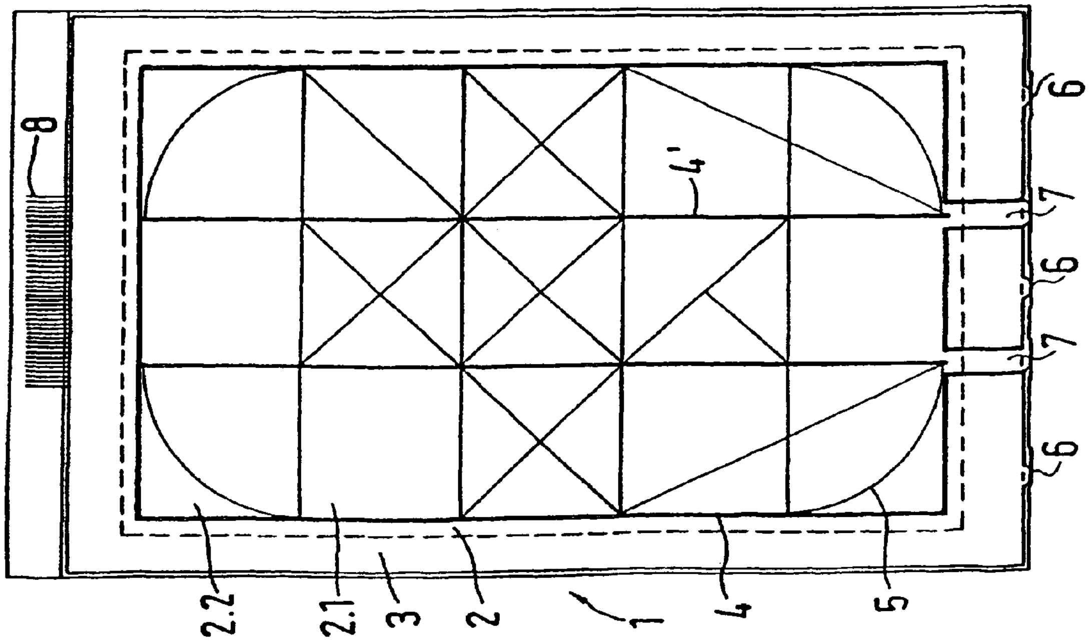
FIG. 1 is a schematic illustration of a liquid crystal display device in a front view, with a plurality of display segments and adhesive pressure applied.

FIG. 1 shows a liquid crystal display device 1, with an active zone 2 which is subdivided into a plurality of subsidiary regions in the form of columns 2.1 and which is demarcated by a surrounding region 3 for an outer boundary by adhesive strips 4 between substrates on both sides. In the interior of the active zone 2, for an inner boundary, the columns 2.1 are demarcated from one another between the substrates on both sides by further adhesive strips 4'. Many segmented surface electrodes, in the present case 38 of them, in the form of segments 2.2 are formed, on the sides toward one another of the substrates on both sides, by thin insulating dividing lines 5, in order to activate a liquid crystal, introduced into the active zone 2 between the substrates via introduction openings 7 in a desired manner.

Figure 2:
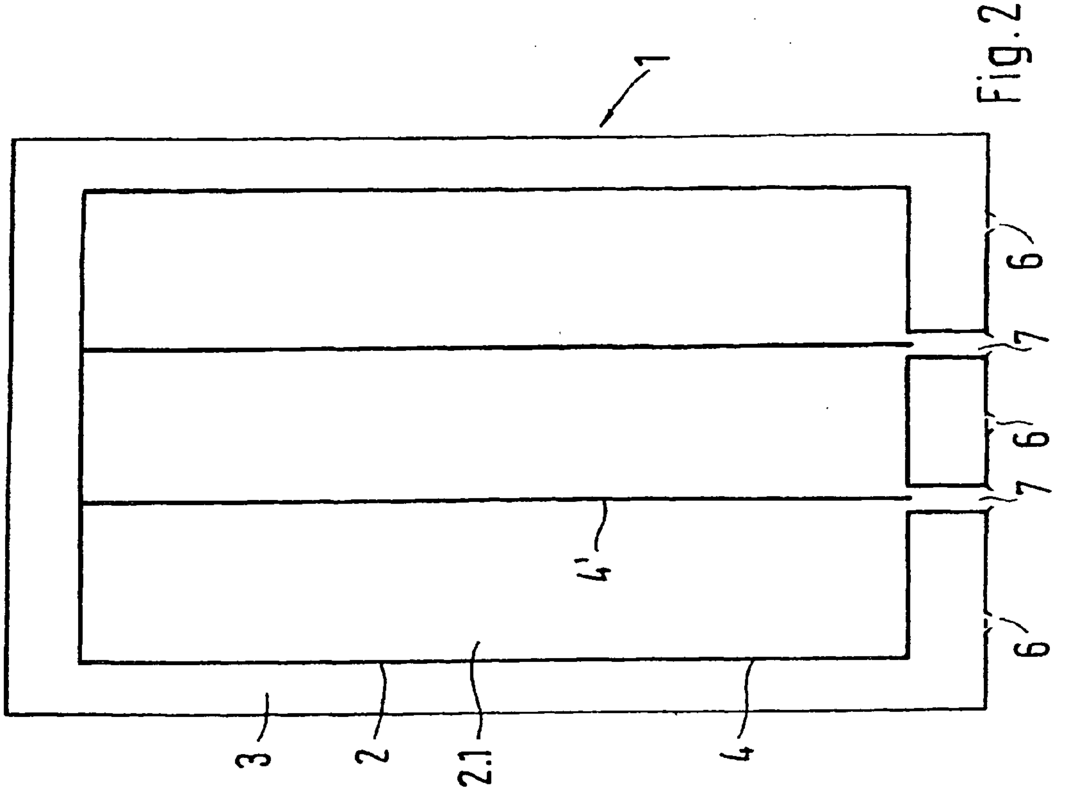
FIG. 2 is a schematic illustration of the liquid crystal display device with the adhesive pressure, of FIG. 1.

In FIG. 2, the adhesive strips 4 serving as an outer boundary of the active zone 2 and the further adhesive strips 4' serving as an inner boundary of the columns 2.1 are shown without the dividing lines 5, for clarity. For venting the surrounding region 3, vent openings 6 are provided.

The liquid crystal display device 1 is covered, as is conventional, on the outside of the substrate with polarization filters, which for a display that is bright when voltageless are disposed with their directions of polarization opposite one another. For viewing at an angle oblique to the normal, and in particular from a lower half-space, for example, as is often the case in looking at large displays, suitable provisions are made, as discussed in German Patent Disclosure DE 37 82 915 A1 and in U.S. Pat. No. 4,952,030, that a liquid crystal with a twisting angle $<90°$ is used.

For simple introduction of the liquid crystal via the introduction openings 7, the further adhesive strips 4' that demarcate the columns 2.1 are disposed with one end of each of them approximately centrally in the introduction opening 7, simplifying introduction of the liquid crystal into the region of the columns 2.1 and subsequently simplifying closure.

The adhesive strips 4 and the further adhesive strips 4' are applied by adhesive pressure to the appropriate points on the inside between the two substrates, before they are joined together in production, and form masking that appears black from outside, for places that would otherwise appear bright. The adhesive bonding of the two substrates and the masking are thus applied with the same adhesive in one production step by adhesive pressure. With areas that are bright when voltageless, all the areas in which there is no liquid crystal appear black is more apparent. This is also true for the areas in which the adhesive is located.

The supply lines, leading to the outside, of transparent conductive material (ITO) to the individual segments 2.2 in the cell extend in the dividing strips between the columns 2.1 and in the areas outside the active zone 2. The adhesive strips 4 and the further adhesive strips 4' cover these areas that otherwise appear bright, so that the strips appear black. The adhesive strips 4 closely surround the active zone 2. The supply lines furnish a connection between terminals 8 and the segments 2.2. The dividing lines 5, produced by etching, between the segments 2.2 can be maintained relatively slender, for example $<0.1$ mm, so that when the display is viewed from a relatively great distance, these dividing lines are not in the way.

Via the vent openings 6, the surrounding region 3 outside the active zone 2 is vented during production. It is sealed once the adhesive has cured.

With the provisions described, this invention provides both a simple structure and stable liquid crystal display device with unimpeded display when it has displays that are bright when voltageless, which is advantageous in particular for high-contrast oblique viewing, for instance from a lower half-space.

The invention claimed is:

1. A liquid crystal display device (1), which in a voltageless state is bright, having a liquid crystal layer placed in an active zone (2) between substrates, the substrates each covered on an outside by pole filters oriented in an arrangement for a voltageless bright display and on an inside carrying segments (2.2) of surface electrodes, the segments being separated from one another by electrically insulating dividing lines (5), the segments being connected to connection lines leading to the outside, and masking for areas that otherwise remain bright in retrace blanking being on the inside of the substrates, the liquid crystal display device comprising:

the active zone (2) surrounded on a periphery with adhesive strips (4) that appear black between the substrates; and the masking produced, at least in bright areas that at a viewing distance are clearly visible being produced by further adhesive strips (4'), and the further adhesive strips (4') are disposed at least in a region of the connection lines.

2. The device of claim 1, wherein the active zone (2) is one of rectangular and square in shape, and the further adhesive strips (4') are continuously parallel to the outside, at equal spacings, for forming subsidiary regions (2.1) in a form of one of rows and columns.

3. The device of claim 2, wherein the connection lines are placed jointly in a second region of the further adhesive strips (4').

4. The device of claim 3, wherein the one of the rows and the columns (2.1) are subdivided into a plurality of one of square and rectangular subgroups of segments (2.2) wherein each of the subgroups includes at least one of the segments (2.2).

5. The device of claim 4, wherein each of the segments (2.2) adjoins one of one of the adhesive strips (4) and the further adhesive strips (4'), which cover the connection lines.

6. The device of claim 5, wherein for introducing the liquid crystal, a peripheral one of the adhesive strips (4) is interrupted in a region of one of the further adhesive strips (4') meeting at a right angle, and each formed introduction opening (7) leads to two subsidiary regions located side by side.

7. A liquid crystal display device (1), which in a voltageless state is bright, having a liquid crystal layer placed in an active zone (2) between substrates, the substrates each covered on an outside by pole filters oriented in an arrangement for a voltageless bright display and on an inside carrying segments (2.2) of surface electrodes, the segments being separated from one another by electrically insulating dividing lines (5), the segments being connected to connection lines leading to the outside, and masking for areas that otherwise remain bright in retrace blanking being on the inside of the substrates, the liquid crystal display device comprising:

the active zone (2) surrounded on a periphery with adhesive strips (4) that appear black between the substrates; and the masking produced at least in bright areas that at a viewing distance are clearly visible being produced by further adhesive strips (4'), and the active zone (2) being one of rectangular and square in shape, and the further adhesive strips (4') being continuously parallel to the outside, at equal spacings, for forming subsidiary regions (2.1) in a form of one of rows and columns.

8. The device of claim 7, wherein the connection lines are placed jointly in a second region of the further adhesive strips (4').

9. The device of claim 2, wherein the one of the rows and the columns (2.1) are subdivided into a plurality of one of square and rectangular subgroups of segments (2.2) wherein each of the subgroups includes at least one of the segments (2.2).

10. The device of claim 9, wherein each of the segments (2.2) adjoins one of one of the adhesive strips (4) and the further adhesive strips (4'), which cover the connection lines.

11. The device of claim 2, wherein for introducing the liquid crystal, a peripheral one of the adhesive strips (4) is interrupted in a region of one of the further adhesive strips (4') meeting at a right angle, and each formed introduction opening (7) leads to two subsidiary regions located side by side.

* * * * *